United States Patent
Kim et al.

(10) Patent No.: US 10,209,736 B2
(45) Date of Patent: Feb. 19, 2019

(54) ELECTRONIC DEVICE

(71) Applicant: Samsung Electronics Co., Ltd., Gyeonggi-do (KR)

(72) Inventors: Yong-Beom Kim, Gyeonggi-do (KR); Sin-Young Park, Seoul (KR); Bo-Won Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 196 days.

(21) Appl. No.: 15/045,689

(22) Filed: Feb. 17, 2016

(65) Prior Publication Data
US 2016/0253015 A1    Sep. 1, 2016

(30) Foreign Application Priority Data
Feb. 27, 2015  (KR) .................. 10-2015-0028205

(51) Int. Cl.
*G06F 1/16*    (2006.01)
*G06F 3/041*   (2006.01)
*B32B 27/04*   (2006.01)

(52) U.S. Cl.
CPC .................. *G06F 1/1626* (2013.01)

(58) Field of Classification Search
None
See application file for complete search history.

(56) References Cited

U.S. PATENT DOCUMENTS

| | | | |
|---|---|---|---|
| 2001/0055678 A1 | 12/2001 | Murata et al. | |
| 2007/0035245 A1* | 2/2007 | Bae | H01J 61/305 313/581 |
| 2010/0317759 A1* | 12/2010 | Ryu | C09J 7/00 521/149 |
| 2010/0323202 A1 | 12/2010 | Burckhardt et al. | |
| 2013/0250504 A1* | 9/2013 | Choi | G06F 1/203 361/679.26 |
| 2013/0344323 A1* | 12/2013 | Fujii | C09J 163/00 428/337 |
| 2014/0015767 A1* | 1/2014 | Hsieh | G06F 3/044 345/173 |
| 2014/0287299 A1 | 9/2014 | Krogdahl | |
| 2016/0301043 A1* | 10/2016 | Morisaku | H01M 2/1077 |

FOREIGN PATENT DOCUMENTS

JP    2007-23113 A    2/2007

\* cited by examiner

*Primary Examiner* — David Sample
*Assistant Examiner* — Nicole T Gugliotta
(74) *Attorney, Agent, or Firm* — Cha & Reiter, LLC.

(57) ABSTRACT

Disclosed are various embodiments related to a bonding member that bonds components of an electronic device. An electronic device may include a tape member that include: a first bonding layer and a second bonding layer. One of the first bonding layer and the second bonding layer comprises a material having a bonding force in a selected range in a predetermined temperature range.

14 Claims, 13 Drawing Sheets

ELECTRONIC DEVICE

CLAIM OF PRIORITY

This application claims the priority under 35 U.S.C. § 119(a) to Korean Application Serial No. 10-2015-0028205, which was filed in the Korean Intellectual Property Office on Feb. 27, 2015, the entire content of which is hereby incorporated by reference.

TECHNICAL FIELD

The present disclosure generally relates to an electronic device that includes a tape member.

BACKGROUND

In recent years, the resolutions of the display units, such as, liquid crystal displays (LCDs) and touch screen panels (TSPs), of portable communication devices have rapidly improved. Such display units are increasingly being provided in portable communication devices, e.g., mobile terminals such as smartphones and the like.

The display unit may include a window part provided on the body of a portable communication device, and a touch screen panel (TSP) attached to the lower side of the window part.

The window part and the touch screen panel may be secured in place between the window part and the touch screen panel by a bonding film, and are laminated. The touch screen panel and the window part are may be attached to a bracket by a double-sided tape. The double-sided tape prevents damage to the touch screen panel and has a strong bonding force such that the touch screen panel is bonded to the bracket.

Increasingly, portable communication devices include embedded battery packs instead of exchangeable battery packs, and when the battery packs are embedded in the portable communication devices, double-sided tape is attached to prevent the movement of the battery packs and the damage thereof due to impacts. That is, the battery packs may be fixed to the portable communication devices by using double-sided tapes.

The other components provided in the portable communication devices also are attached mainly by using double-sided tape. The double-sided tape contains strong bonding forces to fix the battery packs and components.

The above description is provided for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

SUMMARY

Typically, a double-sided tape, implements a strong bonding force to fix a touch screen panel and a window part to a bracket and implements a strong bonding force to fix a battery pack and other components. As a result, the components may ordinarily be damaged due to the strong bonding force when the components are reassembled and/or disassembled, for example to facilitate repairs. As a result, the bonding force becomes weak when the double-sided tape is damaged so that the components cannot be reused.

Meanwhile, when the bonding force of the double-sided tape is lowered to easily disassemble the components in order to overcome the disadvantages, the fixing or adhering force between the components deteriorates and the reliability of the product is lowered.

As a result, an apparatus that allows the components to be easily reassembled and disassembled without the above disadvantages is desirable.

In an aspect of the present disclosure, a first tape member reacts according to a temperature change to vary the bonding force between components provided in an electronic device, for a substrate, so that a fixing force between the components may be improved by maintaining a strong bonding force between the components at a low temperature or a high temperature, and the components may be easily reassembled and disassembled when the components are repaired, by allowing the tape member to react at a specific temperature within a range (for example, at any temperature between 50° C. to 70° C. inclusive or at one specific temperature within that range) in order to decrease the bonding force, and a method of manufacturing the same.

In accordance with an aspect of the present disclosure, an electronic device may include: an outer housing that includes a first plate and a second plate that faces an opposite side of the first plate; a structural body that is arrange between the first plate and the second plate in the outer housing and includes a first surface that faces the first plate and a second surface that faces the second plate; components that are arranged between the first and second plates and the first and second surfaces of the structural body; and a first tape member that is arranged between the structural body and the components. The first tape member may include: a first bonding layer that makes contact with at least some of the components; a second bonding layer that makes contact with the first and second surfaces; and a substrate that is arranged between the first bonding layer and the second bonding layer, and wherein one of the first bonding layer and the second bonding layer includes a material having a bonding force in a selected range in a selected temperature range.

In accordance with another aspect of the present disclosure, a method of manufacturing a tape member that bonds components provided in an electronic device may include: manufacturing a substrate; providing a first bonding layer that bonds the components on one surface of the substrate; and providing a second bonding layer that reacts according to a temperature change to vary bonding forces of the components on an opposite surface of the substrate.

According to various embodiments of the present disclosure, a tape member may react according to a temperature change to vary the bonding forces between components provided in an electronic device is provided in a substrate to maintain a strong bonding force between the components at a low temperature or a high temperature, thereby improving fixing force and secure reliability.

Furthermore, because the tape member reacts at a specific temperature (for example, 50° C. to 70° C.) to lower bonding force so that the relatively high-priced components may be disassembled without being damaged by using a relatively low-priced heat chamber to provide a high temperature environment, the product can be easily reassembled and disassembled when being repaired, and accordingly, repair costs of the product can be reduced.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
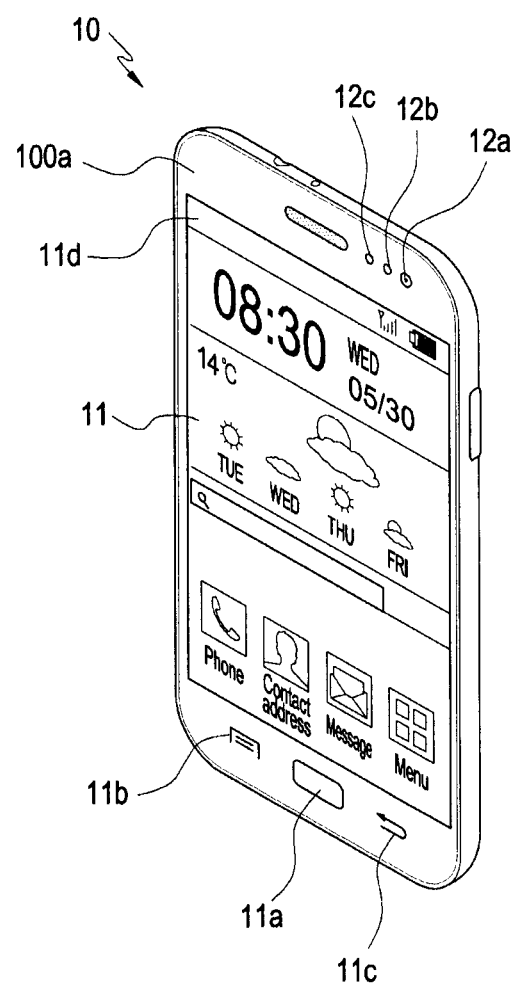
FIG. 1 is a perspective view illustrating a front surface of an electronic device including a plurality of components according to an embodiment of the present disclosure.

Hereinafter, various embodiments of the present disclosure will be described in detail. Firstly, terms used in the various embodiments of the present disclosure will be briefly described.

With respect to the terms in the various embodiments of the present disclosure, the general terms which are currently and widely used are selected in consideration of functions of structural elements in the various embodiments of the present disclosure. However, meanings of the terms may be changed according to an inventor's intention, a judicial precedent, appearance of a new technology, and the like. Further, in a certain case, a term arbitrarily selected by the applicant may be used. In such a case, the meaning of the term will be described in detail at the corresponding part in the description of the present disclosure. Thus, the terms used in various embodiments of the present disclosure should be defined based on the meanings of the terms and the overall contents of the embodiments of the present disclosure instead of simple titles of the terms.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure.

Herein, an electronic device that are charged using a wireless charging device according to various embodiments of the present disclosure will be described. First, the electronic device according to embodiments of the present disclosure may be applied to not only all types of mobile communication terminals that are operated based on communication protocols corresponding to various communication systems, but also all types of information and communication devices, multimedia devices, and application devices thereof, including a video phone, an electronic book (e-book) reader, a laptop personal computer (PC), a netbook computer, a personal digital assistant (PDA), a portable multimedia player (PMP), an MP3 (MPEG-1 audio layer-3) player, a mobile medical appliance, a camera, or a wearable device (e.g., a head-mounted-device (HMD) such as electronic glasses, electronic clothes, an electronic bracelet, an electronic necklace, an electronic accessory, electronic tattoos, or a smart watch).

According to some embodiments, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to another embodiment, the electronic devices may include at least one of various medical devices (e.g., a magnetic resonance angiography (MRA), a magnetic resonance imaging (MRI), a computed tomography (CT) machine, and an ultrasonic machine), navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function.

An electronic device including a plurality of components according to various embodiments of the present disclosure may be a combination of one or more of the above described various devices. Also, an electronic device according to various embodiments of the present disclosure may be a flexible device. Also, an electronic device according to various embodiments of the present disclosure is not limited to the above described devices.

Figure 2:
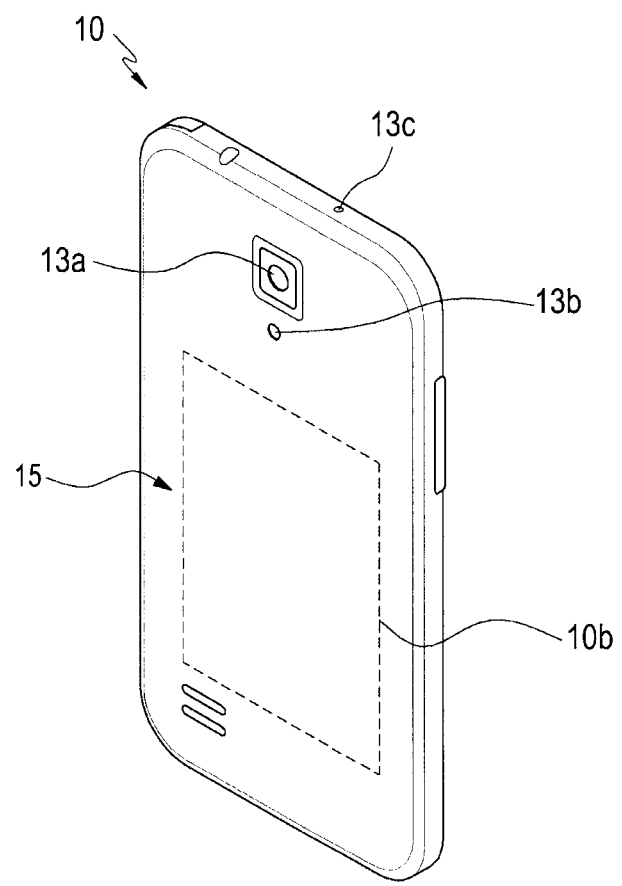
FIG. 2 is a perspective view illustrating a rear surface of an electronic device including a plurality of components according to an embodiment of the present disclosure.

FIG. 1 is a perspective view illustrating a front surface of an electronic device. FIG. 2 is a perspective view illustrating a rear surface of the electronic device. The electronic device 10 may be a smart phone or a wearable device. Hereinafter, components of an electronic device, such as a smart phone, will be described with reference to FIGS. 1 and 2.

As illustrated in FIG. 1, a touch screen 11 may be disposed at the center of the front surface of the electronic device 10. The touch screen 11 may occupy most of the front surface of the electronic device 10. FIG. 1 illustrates an example in which a main home screen is displayed on the touch screen 11. The main home screen is the first screen that is displayed on the touch screen 11 when the electronic device 10 is turned on. When the electronic device 10 has several pages of different home screens, the main home screen may be the first of the several pages of home screens. Various icons such as short-cut icons for executing frequently used applications, a main menu switching key, time, weather, and the like may be displayed on the main home screen. The main menu switching key may display a menu screen on the touch screen 11. A status bar 11d for displaying a status, such as a battery charging status, the strength of a received signal, and the current time, may also be formed on the upper end of the touch screen 11. A home key 11a, a menu button 11b, and a back button 11c may be formed on the lower side of the touch screen 11.

The home key 11a may display the main home screen on the touch screen 11. For example, when the home key 11a is touched while any home screen different from the main home screen or the menu screen is displayed, the main home screen may be displayed on the touch screen 11. If the home key 11a is touched while applications are being executed on the touch screen 11, the main home screen may be displayed on the touch screen 11. Also, the home button 11a may also be used to display recently used applications or a task manager on the touch screen 11. The menu button 11b may provide a connectivity menu, which may be used on the touch screen 11. The connectivity menu may include a widget addition menu, a background-switching menu, a search menu, an editing menu, and an environment setting menu. The back button 11c may display the screen that was executed immediately before the currently executed screen or may terminate the most recently used application.

According to various embodiments of the present disclosure, a first camera 12a, an illumination sensor 12b, or a proximity sensor 12c may be arranged or positioned on an upper end area of the front surface of the electronic device 10. A second camera 13a, a flash 13b, or a speaker 13c may be provided on a rear surface of the electronic device 10. If the electronic device 10 is configured such that a battery pack is detachable, the bottom surface of the electronic device 10 may include a detachable battery cover 15 which may cover a space 10b in which a battery (not shown) may be releasably secured.

The electronic device 10 that will be described below may be any one of a wearable device, a notebook, a netbook, a smartphone, a tablet PC, a tablet computing device, such as a GALAXY TAB or an il-PAD. In a particular embodiment of the present disclosure, the electronic device 10 may be a smartphone.

Figure 3:
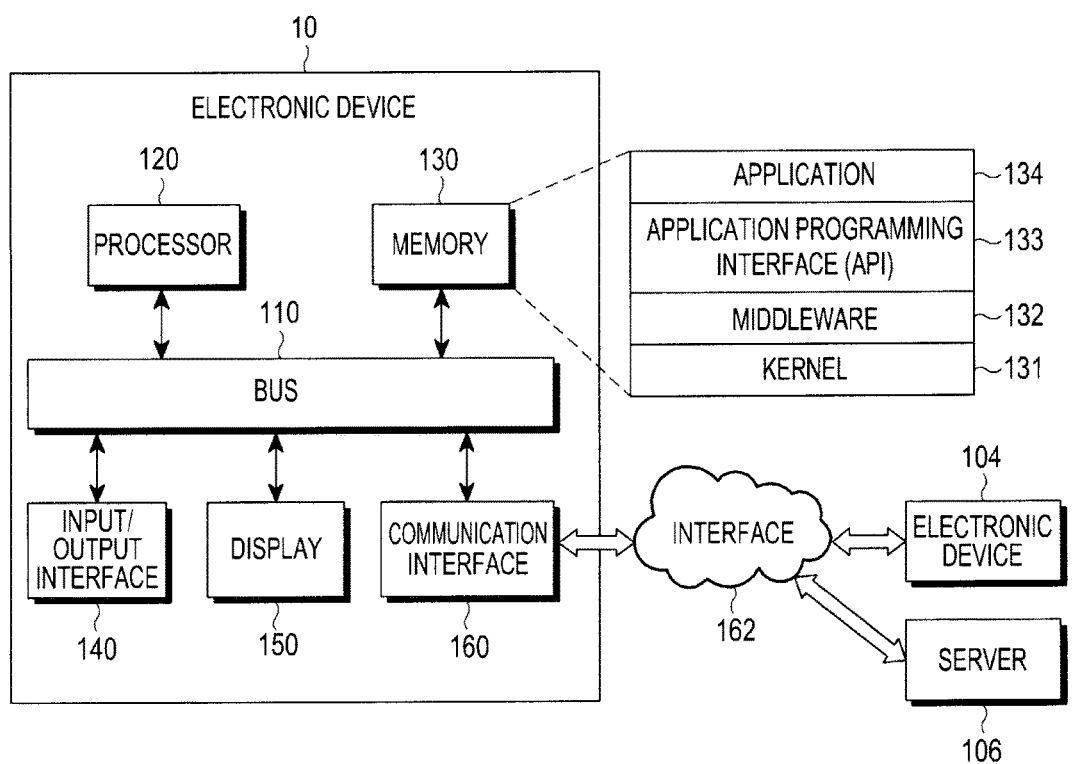
FIG. 3 is a block diagram illustrating a network environment including an electronic device according to an embodiment of the present disclosure.

FIG. 3 illustrates a network environment 100 that includes an electronic device 10 according to various embodiments.

Referring to FIG. 3, the electronic device 10 may include: a bus 110, a processor 120, a memory 130, an input/output interface 140, a display unit 150, and a communication interface 160. The bus 110 may be a circuit for connecting elements of the electronic device 10 and transferring communication (for example, a control message) between the elements.

The processor 120 may, for example, receive instructions from the other components (for example, the memory 130, the input/output interface 140, the display unit 150, the communication interface 160, etc.) through the bus 110, decode the received instructions, and carry out operations or data processing according to the decoded instructions.

The memory 130 may store instructions or data received from, or generated by, the processor 120 or the other components, which may include for example, the input/output interface 140, the display unit 150, the communication interface 160, and the like.). The memory 130 may include, for example, programming modules, such as a kernel 131, middleware 132, an Application Programming Interface (API) 133, and applications 134. The programming modules may include software, firmware, hardware, or a combination of two or more thereof.

The kernel 131 may control or manage system resources (for example, the bus 110, the processor 120, and the memory 130) that are used to execute operations or functions implemented in the other programming modules, such as, for example, the middleware 132, the API 133, and the applications 134. The kernel 131 may provide an interface through which the middleware 132, the API 133, or the applications 134 access individual elements of the electronic device 10 to control or manage the elements.

The middleware 132 may function as an intermediary that allows the API 133 or the applications 134 to communicate with the kernel 131 to exchange data. With respect to task requests received from the applications 134, the middleware 132 may, for example, execute a control (for example, scheduling or load balancing) for the task requests using a method of assigning a priority to use system resources of the electronic device 10 (for example, the bus 110, the processor 120, and the memory 130) to at least one of the applications 134.

The API 133 is an interface used, by the application 134, to control a function provided from the kernel 131 or the middleware 132, and may include, for example, at least one interface or function (for example, an instruction) for file control, window control, image processing, and/or text control.

According to various embodiments of the present disclosure, the applications 134 may include a short message service (SMS)/multimedia message service (MMS) application, an e-mail application, a calendar application, an alarm application, a health care application (for example, an application for measuring a work rate or blood sugar), and an environment information application (for example, an application for providing atmospheric pressure, humidity, or temperature information). Additionally or alternatively, the applications 134 may be an application associated with information exchange between the electronic device 10 and an external electronic device (for example, an electronic device 104). The application associated with the exchange of information may include, for example, a notification relay application for transferring specific information to an external electronic device or a device management application for managing an external electronic device.

For example, the notification relay application may have a function of forwarding, to an external electronic device (for example, the electronic device 104), notification information generated from other applications of the electronic device 10 (for example, an SMS/MMS application, an e-mail application, a health care application, and an environmental information application). Additionally or alternatively, the notification relay application may, for example, receive notification information from an external electronic device (for example, the electronic device 104) and may provide the received notification information to a user. The device management application may, for example, manage (for example, install, delete, or update) a function for at least a part of an external electronic device (for example, the electronic device 104) communicating with the electronic device 10 (for example, activating/deactivating the external electronic device itself (or some components thereof) or adjusting the brightness (or resolution) of a display), an application operating in the external electronic device, and/or a service provided from the external electronic device (for example, a telephone call service or a message service).

According to various embodiments of the present disclosure, the applications 134 may include an application specified according to the property (for example, type) of an external electronic device (for example, the electronic device 104). For example, when the external electronic device is an MP3 player, the applications 134 may include an application relating to the reproduction of music. Similarly, in cases where the external electronic device is a mobile medical device, the applications 134 may include an application relating to health care. According to an embodiment of the present disclosure, the applications 134 may include at least one of the applications specified to the electronic device 10 or applications received from an external electronic device (for example, a server 106 or the electronic device 104).

The input/output interface 140 may forward instructions or data input by a user through an input/output device (for example, a sensor, a keyboard, or a touch screen) to the processor 120, the memory 130, and the communication interface 160 through the bus 110. For example, the input/output interface 140 may provide the processor 120 with data corresponding to a user touch input through a touch screen. The input/output interface 140 may, for example, output instructions or data received through the bus 110 from the processor 120, the memory 130, and the communication interface 160 through an input/output device (for example, a speaker or display). The input/output interface 140 may include an audio module.

The display unit 150 may display various types of information (for example, multimedia data, and text data) to a user.

The communication interface 160 may connect communication between the electronic device 10 and an external electronic device (for example, the electronic device 104 or the server 106). For example, the communication interface 160 may be connected to a network 162 through wireless or wired communication to communicate with the external device. The wireless communication may include, for example, at least one of wireless fidelity (Wi-Fi), Bluetooth (BT), near field communication (NFC), a global positioning system (GPS), and cellular communication (for example, LTE, LTE-A, CDMA, WCDMA, UMTS, WiBro, GSM, etc,). The wired communication may include at least one of, for example, a universal serial bus (USB), a high definition multimedia interface (HDMI), recommended standard 232 (RS-232), and a plain old telephone Service (POTS).

According to an embodiment of the present disclosure, the network 162 may be a telecommunication network. The telecommunication network may include at least one of a computer network, the Internet, Internet of Things, and a telephone network. According to an embodiment of the present disclosure, a protocol for communication between the electronic device 10 and an external device (for example, a transport layer protocol, a data link layer protocol, or a physical layer protocol) may be supported by at least one of the applications 134, the API 133, the middle ware 132, the kernel 131, and the communication interface 160.

According to various embodiments of the present disclosure, a controller may include the processor 120 and the memory 130 for storing information required by the processor 120. The controller is a central processing unit that controls the overall operations of the electronic device 10.

The electronic device 10 (see FIG. 1), according to various embodiments of the present disclosure, may have a plurality of components therein as described above. That is, the components may be attached by means of a first tape member according to the present disclosure. The components may be attached by other bonding means in addition to the first tape member 200 (see FIG. 4) according to the present disclosure. For example, the tape member may include a double-sided bonding tape.

Figure 4:
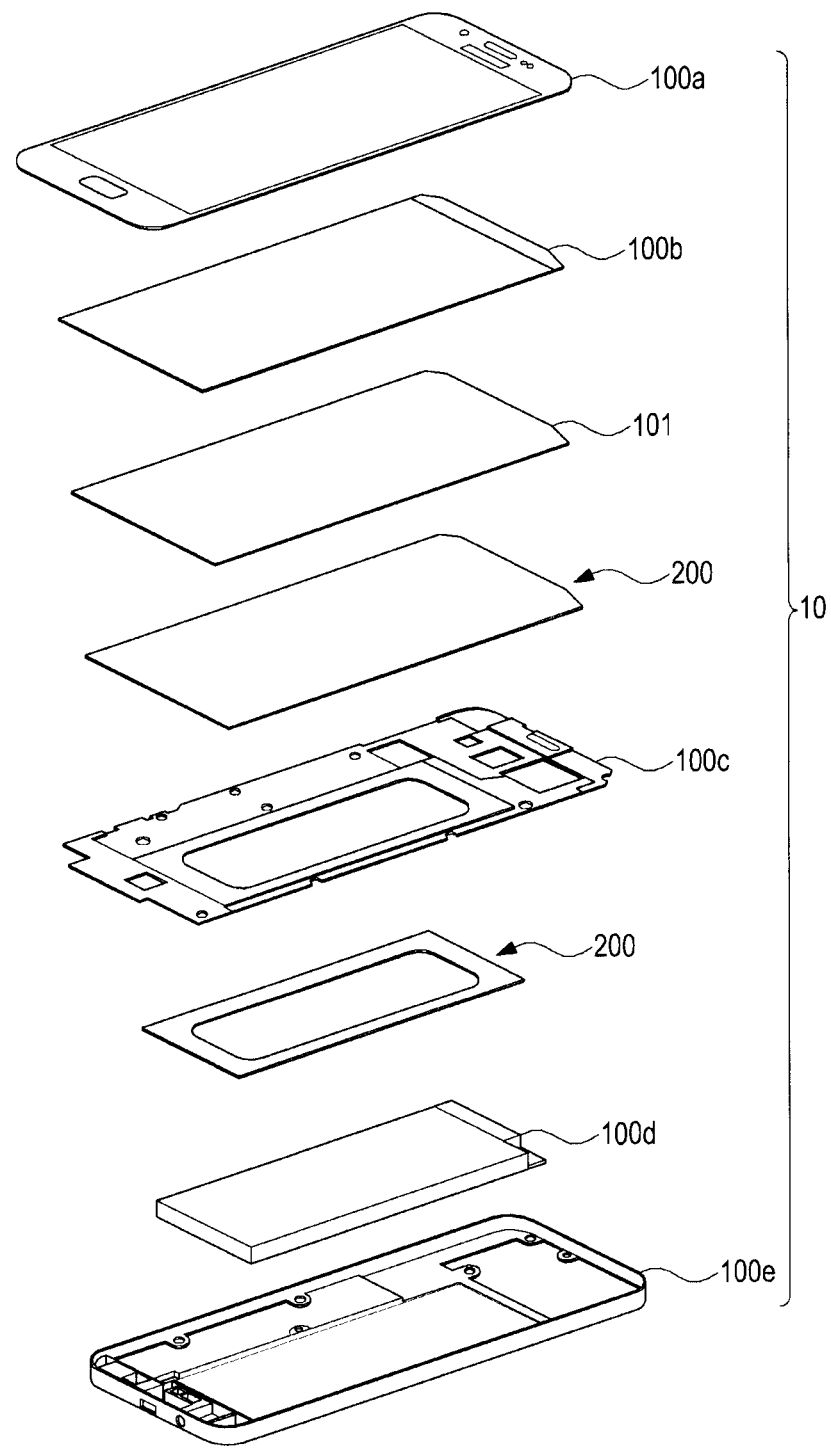
FIG. 4 is an exploded perspective view illustrating a configuration of an electronic device including a first tape member according to an embodiment of the present disclosure.

As illustrated in FIG. 4, the components, according to various embodiments of the present disclosure, may include any one or all of a window part 100a, a touch panel 100b, a display module, a flexible display unit 100f (see FIG. 8), an LCD, a support frame 100c, a battery pack 100d, and a rear case 100e. The embodiment of the present disclosure is not limited to the disclosed components 100a to 100e. That is, other components, in addition to the disclosed components, may be included as long as they are components 100a to 100e that are bonded by using the first tape member 200.

In addition, the design of the display unit of the electronic device may be implemented more luxuriously while a bezel area is minimized or the display unit is made larger. A flexible display unit may be provided, or a convex or concave display unit may be implemented.

That is, a peripheral portion of the display unit is bent such that the viewing area may be enlarged to a side surface of the electronic device. As the viewing area of the display unit is bent to be enlarged to the side surface of the electronic device, the viewing area may be enlarged or a separate screen may be used on the side surface, and the design of the display unit may be implemented luxuriously. That is, the display unit includes a first view area and a second view area provided on opposite side surfaces of the first screen area.

Figure 5:
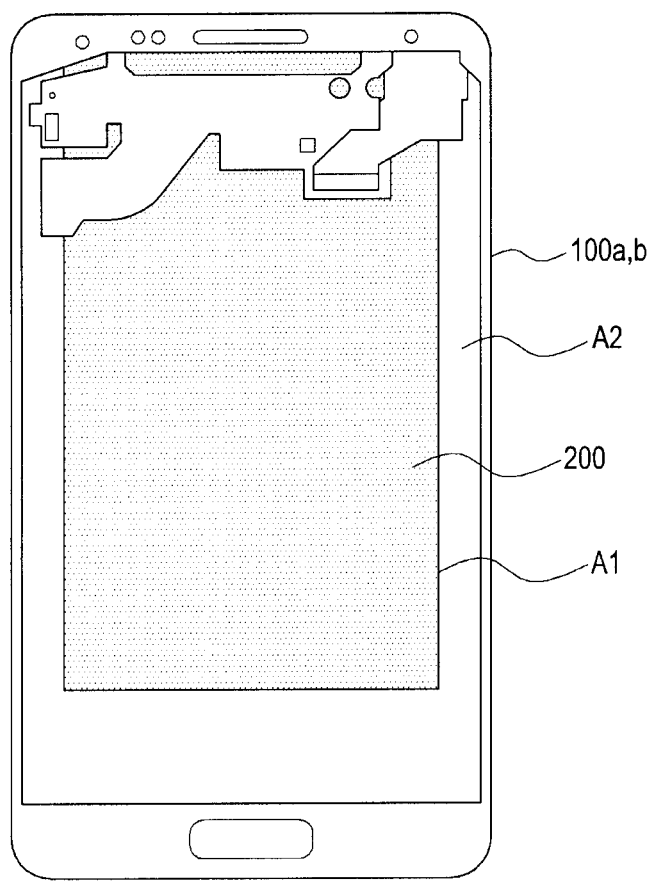
FIG. 5 is a plan view illustrating a configuration of an electronic device including a first tape member according to an embodiment of the present disclosure.

FIG. 4 is an exploded perspective view illustrating a configuration of an electronic device 10 that includes a first tape member 200 according to various embodiments of the present disclosure. FIG. 5 is a plan view illustrating a configuration of an electronic device 10 including a first tape member 200 according to various embodiments of the present disclosure.

Referring to FIGS. 4 and 5, the electronic device 10 includes an outer housing that includes a first plate and a second plate that faces an opposite side of the first plate, a structural body that is arranged between the first plate and the second plate in the outer housing and includes a first surface that faces the first plate and a second surface that faces the second plate, components that are arranged between the first and second plates and the first and second surfaces, and a first tape member arranged between the structural body and the components.

The first plate includes a window part 100a, and the second plate includes a rear case 100e. The components include a display module and a battery pack 100d. The display module may include a touch panel 100b.

The first tape member 200 includes a substrate 210 and first and second bonding layers 220 and 230.

The substrate 210 may be provided between the first and second bonding layers 220 and 230, which will be described below, such that the first and second bonding layers 220 and 230, which will be described below, are provided.

The first bonding layer 220 may be provided on one surface of the substrate 210 to make contact with at least some of the components. The second bonding layer 230 may be provided on an opposite surface of the substrate 210 to make contact with the first and second surfaces of the structural body.

One of the first bonding layer 220 and the second bonding layer 230 may be formed of a material that has a bonding force within a range selected from a selective temperature range.

That is, one of the first bonding layer 220 and the second bonding layer 230 reacts according to a change in the selective temperature (for example, 50° C. to 70° C.) to vary the boding force between the components 100a to 100e.

In the selected temperature range, one of the first bonding layer 220 and the second bonding layer 230 may have a bonding force that is weaker than that of the remaining one of the first bonding layer 220 and the second bonding layer 230.

In the embodiment of the present disclosure, if the second bonding layer 230 is selectively described among the first bonding layer 220 and the second bonding layer 230, the second bonding layer 230 is provided on the opposite surface of the substrate 210 to increase the bonding force at a low or high temperature and to react according to the selected temperature change to lower a bonding force between the components 100a to 100e as well, so that the reliability of the electronic device 10 can be secured by improving a fixing force between the components 100a to 100e and the components can be conveniently reassembled and disassembled when the components 100a to 100e are repaired.

The second bonding layer 230 may include a material that has a bonding force in the selected range in the selected temperature range. The material may include a thermally reactive bonding layer.

It is preferable that the material of the substrate 210 include any one of Poly Ethylenetere Phthalate (PET), Poly Methyl Methacrylate (PMMA), and Poly Carbonate (PC). The material of the substrate 210 may be a material other than the disclosed materials. For example, the substrate 210 may be formed of a metallic material such as a copper (Cu) sheet or an aluminum (Al) sheet.

The material of the first and second bonding layers 220 and 230 may be an acryl based adhesive. The first and second bonding layers may include an adhesive other than the acryl based adhesive. For example, the first and second bonding layers 220 and 230 may include a rubber based adhesive, a vinyl alkyl ether based adhesive, a silicon based adhesive, a polyester based adhesive, a polyamide based adhesive, a urethane based adhesive, a fluorine based adhesive, and an epoxy based adhesive.

The first bonding layer 220 may maintain a strong bonding force at a low or high temperature. The first bonding layer 220 may maintain a strong bonding force at a temperature within the range of −40° C. to 80° C. inclusive.

The bonding force of the first bonding layer 220 in the selected range may be within 2500 gf to 4000 gf inclusive at a temperature between −40° C. to 80° C. inclusive.

The second bonding layer 230 increases the bonding force at a low or high temperature, and reacts at 50° C. to 70° C. to lower bonding force. That is, the second bonding layer 230 maintains a strong bonding force at a temperature within a range of −40° C. to 80° C. inclusive, and the second bonding layer 230 lowers bonding force when being heated at a temperature within a range of 50° C. to 70° C. inclusive.

The bonding force of the second bonding layer 230 in the selected range may be 2500 gf to 4000 gf at a low or high temperature, and may be 200 gf to 1000 gf inclusive at temperature within the range of 50° C. to 70° C. inclusive.

That is, when the bonding force of the second bonding layer 230 is lowered to a temperature within the range of 50° C. to 70° C. inclusive, the components are separated from the second bonding layer 230.

As illustrated in FIG. 5, the first tape member 200 is provided in a first area A1 formed on the inside of the components 100a to 100e of the electronic device 10, and is not provided in a second area A2 formed at an outer circumference of the components of the electronic device 10. The second area A2 may be a structural part that is vulnerable to damage to a sealed part, an assembled part, and the like of the components themselves, and may be an avoidance area or a mounting area for additionally mounting other components.

A plurality of auxiliary materials 101 that provide various performances may be provided between the panel 100b and the first bonding layer 220, and the auxiliary materials 101 may include an impact absorbing auxiliary material, a heat radiation auxiliary material, and a conductive auxiliary material.

The conductive auxiliary material may include any one of a copper (CU) sheet and an aluminum (Al) sheet. While as described herein, the conductive auxiliary material may include a copper (CU) sheet and an aluminum (Al) sheet, it is to be understood that the present disclosure is not limited thereto. That is, various conductive sheets which may be formed from other materials, through which current flows, may be applied as the conductive auxiliary material.

Figure 8:
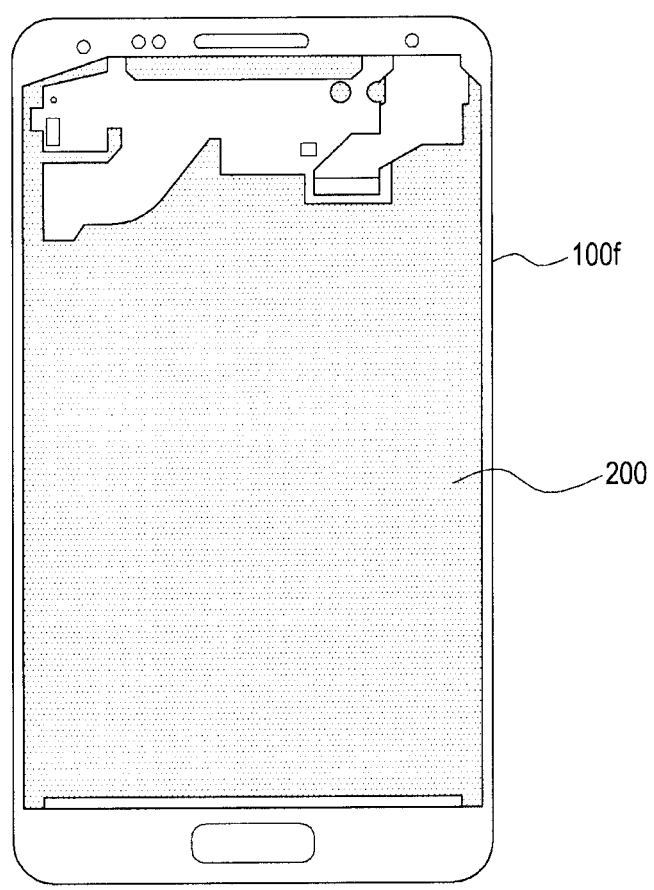
FIG. 8 is a plan view illustrating a state in which a first tape member is applied to a flexible display unit according to an embodiment of the present disclosure.

FIG. 8 is a plan view illustrating a state in which the first tape member 200 according to the present disclosure is applied to a flexible display unit 100f of the electronic device 10.

As illustrated in FIG. 8, the tape member 200 may be provided in components (not illustrated) provided in the flexible display unit 100f.

That is, the first tape member 200 is provided in both of the first and second areas formed on the outside and inside of the components. That is, the first tape member 200 has substantially the same size as the flexible display unit 100f and is attached to the flexible display unit 100f.

Figure 9:
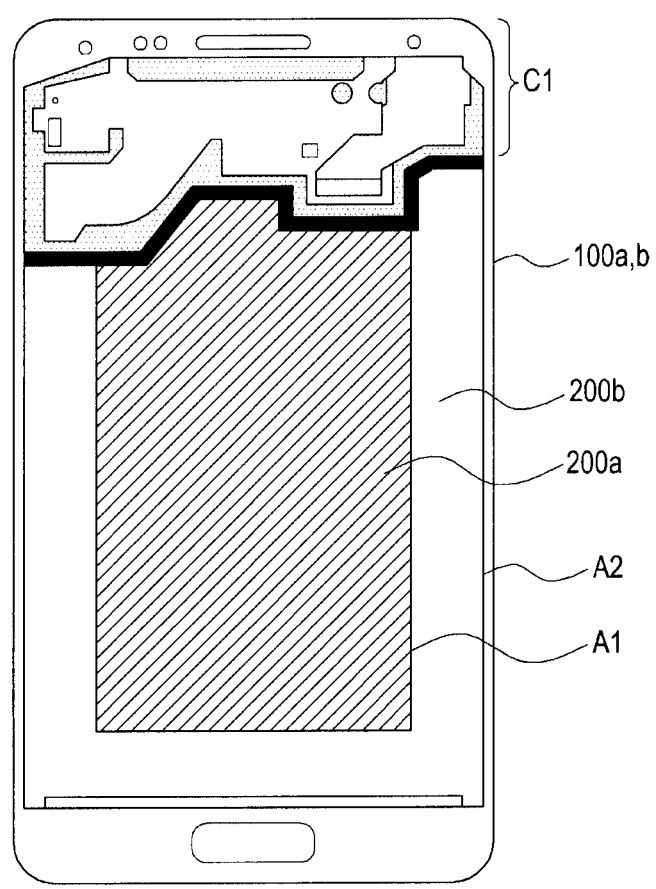
FIG. 9 is a plan view illustrating an electronic device including a first tape member according to another embodiment of the present disclosure.
Figure 10:
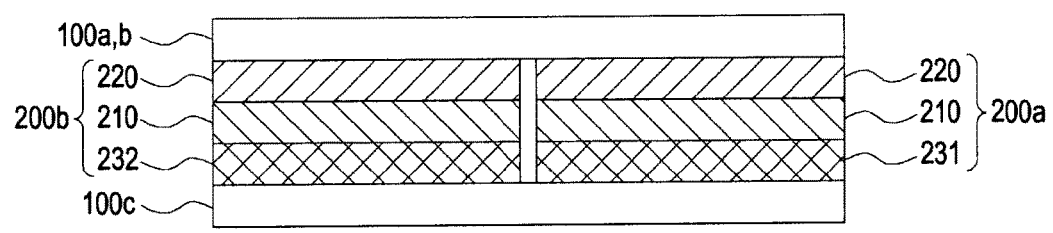
FIG. 10 is a side sectional view illustrating an electronic device including a first tape member according to another embodiment of the present disclosure.
Figure 11:
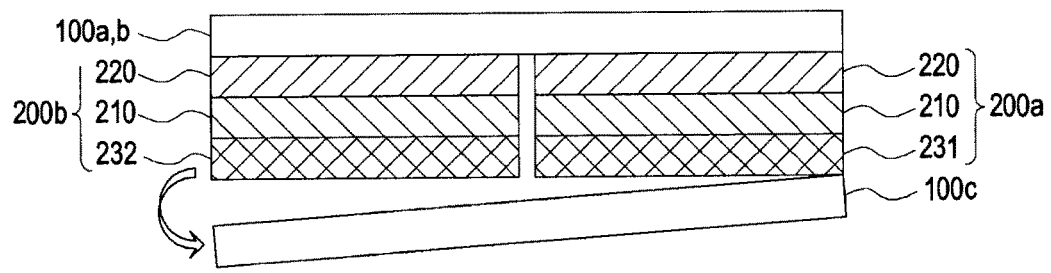
FIG. 11 is a side sectional view illustrating an operational state of an electronic device including a first tape member according to another embodiment of the present disclosure.

FIG. 9 is a plan view illustrating a first tape member 200 according to another embodiment of the present disclosure. FIG. 10 is a side sectional view illustrating a first tape member according to another embodiment of the present disclosure. FIG. 11 is a side sectional view illustrating an operational state of a first tape member according to the present disclosure.

As illustrated in FIGS. 9 to 11, the first tape member 200 may include first and second bonding parts 200a and 200b. Each of the first and second bonding parts 200a and 200b includes a substrate 210, a first bonding layer 220, and second bonding layer parts 231 and 232.

The first bonding part 200a may be provided in a first area A1 formed on the inside of each of the components 100a, 100b, and 100c of the electronic device 10.

The second bonding part 200b may be provided in a second area A2 formed on the outside of the components 100a, 100b, and 100c of the electronic device 10 and may have a bonding force that is lower than that of the first bonding part 220.

As illustrated in FIG. 11, the first bonding part 200a is attached to the inside of the components 100a, 100b, and 100c of the electronic device 10 and forms a bonding force that is stronger than that of the second bonding part 200b, and the second bonding part 200b is attached to the outside of the electronic device 10 and forms a bonding force that is weaker than that of the first bonding part 200a.

That is, the second bonding layer 232 of the second bonding part 200b forms a bonding force that is weaker than that of the second bonding layer 231 of the first bonding part 200a.

Accordingly, because the components 100a, 100b, and 100c of the electronic device 10 are easily damaged at a release start point when the components are released, the components 100a, 100b, and 100c may be conveniently separated without being damaged by weakening the bonding force of the second bonding part 200b located at the release start point when the components are released. In this way, if it is desired to more easily disassemble the components in an initial release direction when the components are released, the strengths of the bonding forces of the first and second bonding parts 200a and 200b, which are provided in the first and second areas A1 and A2 on the inside and outside of the electronic device 10, are differently formed.

In addition, as illustrated in FIG. 9, an isolated part C1 is provided at upper ends of the components 100a and 100b. The isolated part C1 is an area that does not have a bonding force to arrange components, such as a display module, or for forming a conductive part (not illustrated). That is, the separated part C1 may be separately provided as an area irrelevant to a bonding structure.

Figure 12:
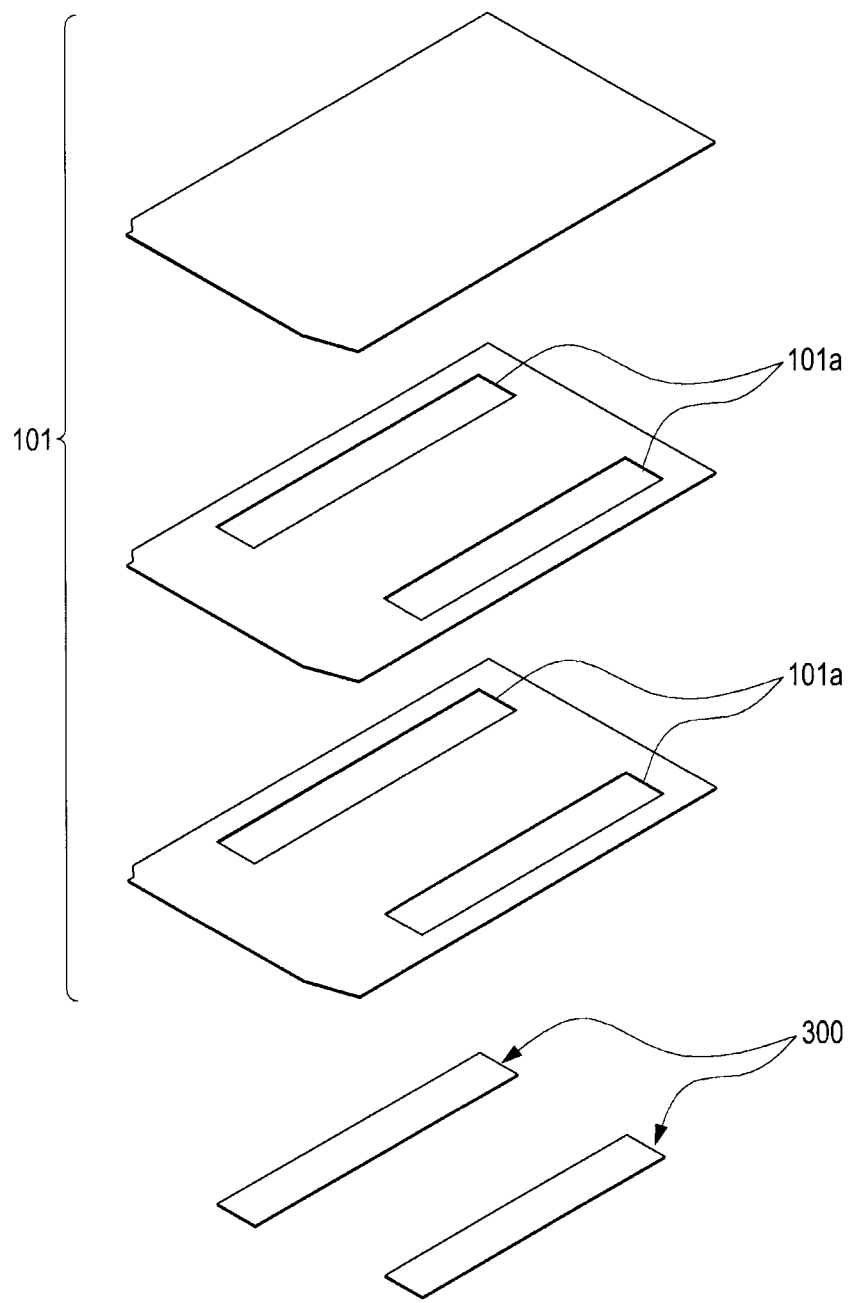
FIG. 12 is an exploded perspective view illustrating a configuration of an electronic device including a first tape member according to another embodiment of the present disclosure.
Figure 13:
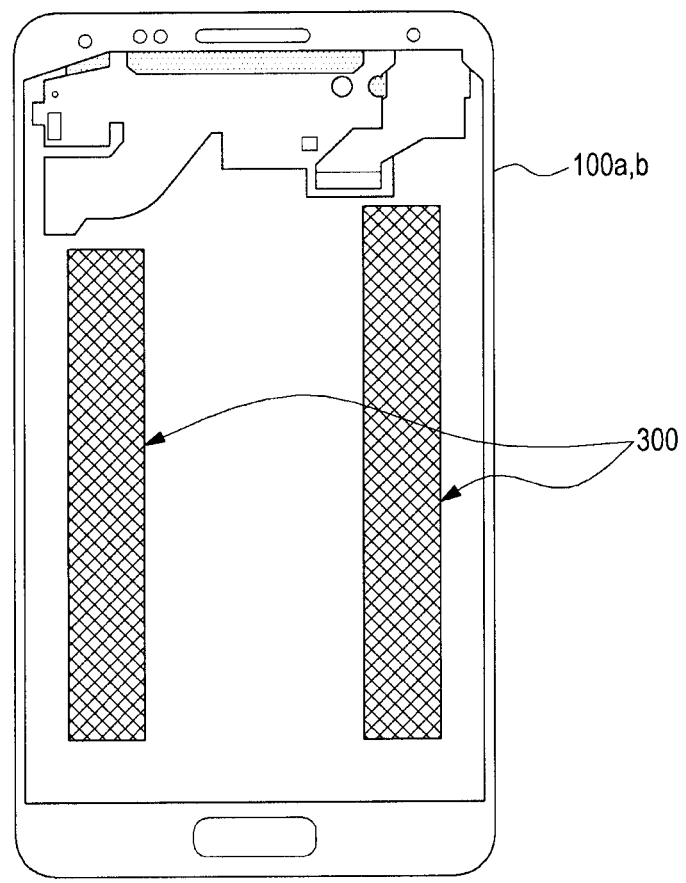
FIG. 13 is a plan view illustrating an electronic device including a first tape member according to another embodiment of the present disclosure.
Figure 14:
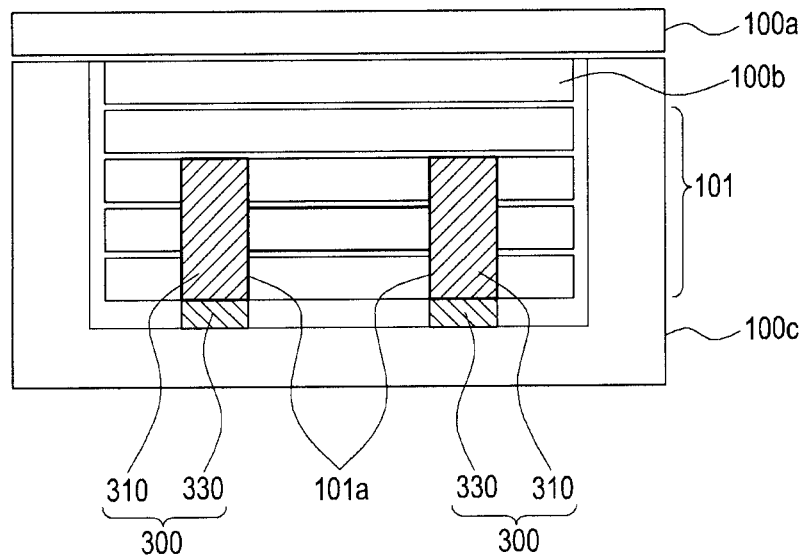
FIG. 14 is a side sectional view illustrating an electronic device including a first tape member according to another embodiment of the present disclosure.

FIG. 12 is an exploded perspective view illustrating a configuration of a first tape member 300 provided in an electronic device 10 according to another embodiment of the present disclosure. FIG. 13 is a plan view illustrating of a first tape member 300 provided in an electronic device 10 according to another embodiment of the present disclosure. FIG. 14 is a side sectional view illustrating a first tape member 300 provided in an electronic device 10 according to another embodiment of the present disclosure.

As illustrated in FIGS. 12 to 14, the first tape member 200 includes a substrate 310 and a second bonding layer 330.

The components of the electronic device 10 includes a window part 100a (see FIG. 4) and a structural body 100c, and auxiliary materials 101 having various performances are provided between the panel 100b (see FIG. 4) and the structural body 100c and include an impact absorbing auxiliary material, a heat radiation auxiliary material, and a conductive auxiliary material.

The impact absorbing auxiliary material includes a mesh and sponge, and the heat radiation auxiliary material includes graphite. The conductive member may include a copper (CU) sheet.

A plurality of through-holes 101a are formed in the auxiliary materials 101, and an upper surface and side surfaces of the substrate 310 pass through the through-holes 101a to be coupled. Because a second bonding layer 330 bonded to the structural body 100c is provided on the lower surface of the substrate 310, the lower surface of the substrate 310 coupled to the through-hole 101a is bonded to the structural body 100c. Then, the second bonding layer 330 provided on the lower surface of the substrate 310 may be bonded to the structural body 100c.

When the components 100a, 100b, and 100c of the electronic device 10 coupled in this way are to be disassembled, the components 100a, 100b, and 100c are inserted into and heated in a low-priced heat chamber (not illustrated). If the temperature of the components reaches 50° C. to 70° C. when the components are heated, the second bonding layer 330 reacts to lower bonding force. That is, because the bonding force of the second bonding layer 330 is lowered to 200 gf to 1000 gf at 50° C. to 70° C., the second bonding layer 330 is easily separated from the structural body 100c. The auxiliary materials 101 are separated together with the second bonding layer 330.

Accordingly, the second bonding layer 300 may allow the components 100a, 100b, and 100c of the electronic device 10 to be easily separated.

Hereinafter, the first tape member 200 that attaches the components 100a to 100e (see FIG. 4) of the electronic device 10 will be described in more detail with reference to FIGS. 6 and 7.

Figure 6:
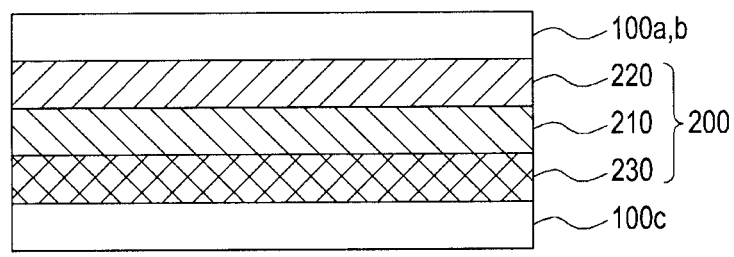
FIG. 6 is a side sectional view illustrating a configuration of an electronic device including a first tape member according to an embodiment of the present disclosure.
Figure 7:
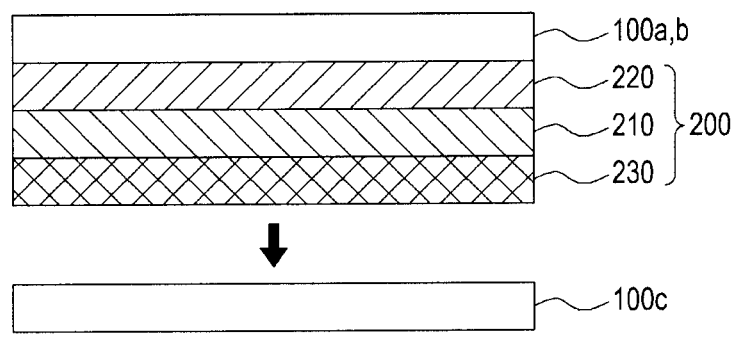
FIG. 7 is a side sectional view illustrating an operational state of an electronic device including a first tape member according to an embodiment of the present disclosure.

FIG. 6 is a side sectional view illustrating a configuration of an electronic device 10 including a first tape member 200 according to the present disclosure. FIG. 7 is a side sectional view illustrating a separated state of an electronic device 10 including a first tape member 200 according to various embodiments of the present disclosure.

As illustrated in FIG. 6, the first tape member 200 includes a substrate 210, and first and second bonding layers 220 and 230. A first bonding layer 220 is provided on one surface of the substrate 210 and a second bonding layer 230 is provided on an opposite surface of the substrate 210.

In this state, as illustrated in FIG. 4, which has been mentioned above, a display module may include a touch panel 100b that is bonded to the first bonding layer 220, and auxiliary materials 101 including an impact absorbing auxiliary material, a heat radiation auxiliary material, and a conductive auxiliary material are provided between the first bonding layer 220 and the touch panel 100b.

As illustrated in FIG. 4, which has been mentioned above, a first surface of the structural body 100c is bonded to the second bonding layer 230. The second bonding layer 230 is bonded to an upper side of the structural body and a first bonding layer 220 of another first tape member 200 is attached to a second surface formed on a lower side of the structural body 100c. A second bonding layer 230 of another first tape member 200 is bonded to the battery pack 100d.

Here, when the electronic device 10 is to be disassembled and repaired to be reused, the electronic device 10 is introduced into a low-priced heat chamber (not illustrated) and is heated.

Because the second bonding layer 230 reacts according to a specific temperature change to lower bonding force when the low-priced heat chamber is heated to 50° C. to 70° C. inclusive, the bonding force of the second bonding layer 230 is lowered to 200 gf to 1000 gf inclusive at a specific temperature of 50° C. to 70° C. inclusive. Then, because the second bonding layer 230 of the first tape member 200 is bonded to the structural body 100c, the second bonding layer 230 and the structural body 100c are separated from each other when the bonding force of the second bonding layer 230 is lowered to 200 gf to 1000 gf inclusive. The second bonding layer 230, of which the bonding force is lowered, is easily separated from the structural body 100c together with the window part and the touch panel 100b.

In this way, the high-priced display unit and the structural body 100c are easily separated without being damaged by the second bonding layer 230.

Similarly, a battery pack 100d bonded to the lower side of the structural body 100c by another first tape member 200 is separated. That is, because the bonding force of the second bonding layer 230 of the first tape member 200 is lowered to 200 gf to 1000 gf at 50° to 70° inclusive, the structural body and the battery pack 100d are easily separated by the second bonding layer 230.

If the electronic device 10 is completely repaired, the components 100a to 100e of the electronic device 10 are bonded again by using the first tape member 200, and if the electronic device 10 is introduced into the low-priced heat chamber (not illustrated) and is heated at a low temperature of 50° C. or less or a high temperature of 70° C., the second bonding layer 230 of the first tape member 200 recovers the initial strong bonding force. Accordingly, the second bonding layer 230 maintains a strong bonding force again, and fixes the components 100a to 100e of the electronic device 10 and improves reliability.

Hereinafter, a method of manufacturing a first tape member 200 according to various embodiments of the present disclosure will be described in detail. First, FIG. 15 is a view illustrating a method of manufacturing a first tape member 200 according to the present disclosure.

Figure 15:
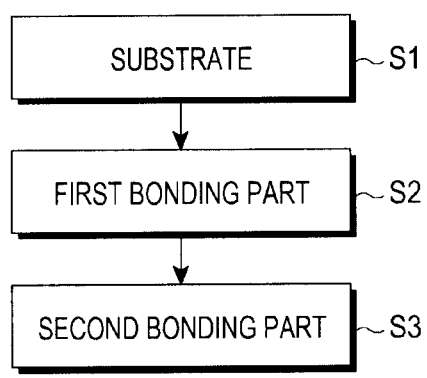
FIG. 15 is a flowchart illustrating a method of manufacturing a first tape member according to an embodiment of the present disclosure.

As illustrated in FIG. 15, first, a substrate 210 including one of the materials that are disclosed below is manufactured (S1).

It is preferable that the material of the substrate 210 includes any one of Poly Ethylenetere Phthalate (PET), Poly Methyl Methacrylate (PMMA), and Poly Carbonate (PC).

A first bonding layer 220 is provided on one surface of the substrate 210 manufactured in S1 (S2).

From S2, a second bonding layer 230 that reacts according temperature change and varies the bonding forces of the components of the electronic device 10 is provided on an opposite surface of the substrate 210 (S3).

The second bonding layer 230 includes a thermally reactive bonding layer that increases bonding force at a low or high temperature, and reacts at 50° C. to 70° C. inclusive to lower bonding force.

The bonding force of the first bonding layer 220 is 2500 gf to 4000 gf.

The bonding force of the second bonding layer 230 is 2500 gf to 4000 gf at a low temperature (e.g., 20° C. to 50° C. inclusive) or high temperature (e.g., 50° C. to 70° C. inclusive), and is 200 gf to 1000 gf inclusive at 50° C. to 70° C. inclusive.

The tape member 200 manufactured in this way bonds a display unit including a window part 100a and a touch panel 100b by the first bonding layer 220, and bonds the structural body 100c by the second bonding layer 230. The second bonding layer 230 is bonded to an upper side of the structural body 100c and a second bonding layer 230 of another first tape member 200 is attached to a second surface formed on a lower side of the structural body 100c. A second bonding layer 230 of another first tape member 200 bonds the battery pack 100d. A rear case 100e is coupled to a lower side of the structural body 100c.

Here, when the electronic device 10 is to be disassembled and repaired to be reused, the electronic device 10 is introduced into a low-priced heat chamber (not illustrated) and is heated.

Because the second bonding layer 230 reacts according to a specific temperature change to lower the bonding force when the low-priced heat chamber is heated to 50° C. to 70° C. inclusive, the bonding force of the second bonding layer 230 is lowered to 200 gf to 1000 gf at a specific temperature of 50° C. to 70° C. Then, because the second bonding layer 230 of the first tape member 200 is bonded to the structural body 100c, the second bonding layer 230 and the structural body 100c are separated from each other when the bonding force of the second bonding layer 230 is lowered to 200 gf to 1000 gf inclusive. The second bonding layer 230, of which the bonding force is lowered, is easily separated from the structural body 100c together with the window part 100a and the touch panel 100b.

In this way, the high-priced display unit and the structural body 100c are easily separated without being damaged by the second bonding layer 230.

Similarly, a battery pack 100d bonded to the lower side of the structural body 100c by another first tape member 200 is separated. That is, because the bonding force of the second bonding layer 230 of the other tape member 200 is lowered to 200 gf to 1000 gf inclusive at 50° to 70° inclusive, the structural body 100c and the battery pack 100d are easily separated by the second bonding layer 230.

Figure 16:
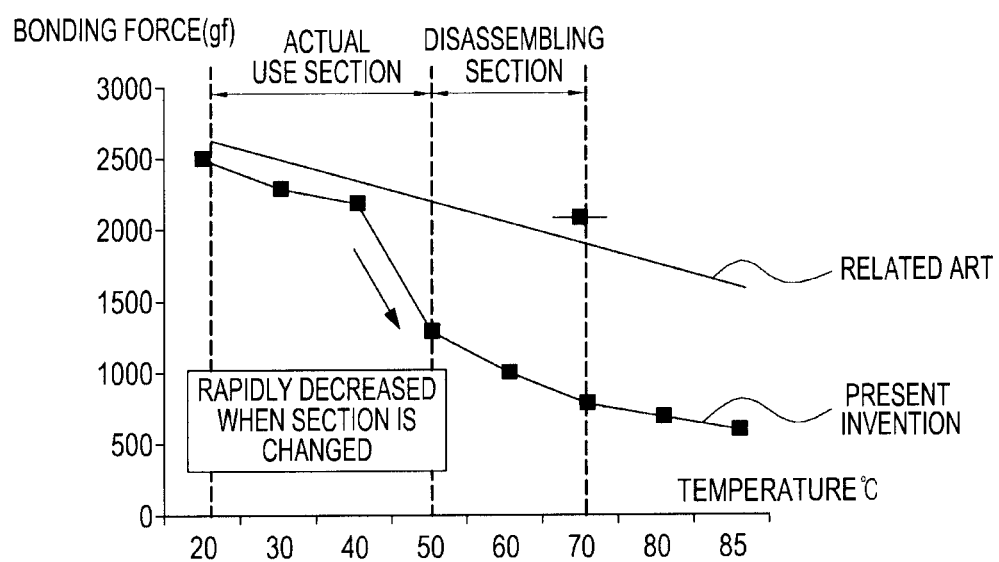
FIG. 16 is a graph illustrating a change in bonding force according to a temperature of a first tape member according to an embodiment of the present disclosure.

According to various embodiments of the present disclosure, FIG. 16 is a graph depicting a change in the bonding force according to the temperatures of the first tape 200 and 300, according to the present disclosure, and a tape member according to the related art.

As illustrated in FIG. 16, the first tape member 200 or 300, according to the present disclosure, exhibits a strong bonding force of between 2000 gf to 25000 gf inclusive in a low temperature section of 20° C. to 50° C. and exhibits a weak bonding force of 200 gf to 1000 gf in a section of 50° C. to 70° C. Accordingly, the first tape member, according to the present disclosure, can allow the components of the electronic device 10 to be easily disassembled in a section of 50° C. to 70° C.

To the contrary, according to the related art, because a tape member maintains an initial bonding force in a section having a temperature range of 50° C. to 70° C. inclusive, high-priced components can be damaged when the components of the electronic device 10 are disassembled.

Accordingly, because the tape member (e.g., tape member 200 or 300), according to the present disclosure, reacts in a selected temperature range to the lower bonding force so that high-priced components may be disassembled without being damaged only by a low-priced heat chamber (not illustrated) in a high temperature environment, the product can be easily reassembled and disassembled when the product is repaired and the repair costs of the product can be reduced.

It will be apparent to those skilled in the art that the electronic device having a tape member according to various embodiments of the present disclosure is not limited to the above described embodiments and drawings, and various modifications, changes, and substitutions may be made thereto without departing from the spirit and scope of the present disclosure as defined by the appended claims.

What is claimed is:

1. An electronic device comprising:
   an outer housing that comprises a first plate and a second plate that faces an opposite side of the first plate;
   a structural body that is disposed between the first plate and the second plate in the outer housing and comprises a first surface that faces the first plate and a second surface that faces the second plate;
   at least one component that is arranged between the first and second plates and disposed on the first surface or the second surfaces of the structural body; and
   a first tape member that is positioned between the structural body and the at least one component,
   wherein the first tape member comprises:
   a first bonding layer that makes contact with the at least one component;
   a second bonding layer that makes contact with the first and second surfaces; and a substrate that is disposed between the first bonding layer and the second bonding layer, and wherein one of the first bonding layer and the second bonding layer comprises a material having a bonding force in a selected range at a predetermined temperature ranger, wherein the first tape member comprises first and second bonding parts, the first bonding part is provided in a first area formed on the inside of the components of the electronic device, and the second bonding part is provided in a second area formed on the outside of the components of the electronic device and forms a bonding force that is weaker than that of the first bonding part.

2. The electronic device of claim 1, wherein in the predetermined temperature range, the one of the first bonding layer and the second bonding layer has a bonding force that is weaker than that of a remaining one of the first bonding layer and the second bonding layer.

3. The electronic device of claim 1, wherein the component comprises a display module.

4. The electronic device of claim 1, wherein the first bonding layer comprises a material having the bonding force in the selected range at the predetermined temperature range.

5. The electronic device of claim 1, wherein the component comprises a battery pack.

6. The electronic device of claim 1, wherein the second bonding layer comprises a material having the bonding force in the selected range at the predetermined temperature range.

7. The electronic device of claim 1, wherein the second bonding layer reacts at the predetermined temperature 50° C. to 70° C. to lower a bonding force than a temperature supposed to be below 50° C. or above 70° C.

8. The electronic device of claim 1, wherein a bonding force of the first bonding layer is within a range of 2500 gf to 4000 gf.

9. The electronic device of claim 1, wherein the components of the electronic device comprise any one of a window part, a touch panel, a flexible display unit, an LCD, and an external appearance member.

10. The electronic device of claim 1, wherein the first tape member is provided in a first area formed on the inside of the components of the electronic device, and is not provided in a second area formed at an outer circumference of the components of the electronic device.

11. The electronic device of claim 1, wherein the first tape member is provided in both of the first and second areas formed on the outside and inside of the components of the electronic device.

12. The electronic device of claim 1, wherein the second bonding layer of the second bonding part forms a bonding force that is weaker than that of the second bonding layer of the first bonding part.

13. The electronic device of claim 1, wherein an impact absorbing auxiliary material, a heat radiation auxiliary material, and a conductive auxiliary material are provided between the components.

14. The electronic device of claim 13, wherein an upper surface and side surfaces of the substrate pass through a plurality of through-holes formed in the auxiliary materials, and a second bonding layer bonded to the components is provided on a lower surface of the substrate.

* * * * *